United States Patent
Cheng et al.

(10) Patent No.: US 10,102,482 B2
(45) Date of Patent: Oct. 16, 2018

(54) FACTORIZED MODELS

(71) Applicant: Google LLC, Mountain View, CA (US)

(72) Inventors: Heng-Tze Cheng, Sunnyvale, CA (US); Jeremiah Harmsen, San Jose, CA (US); Alexandre Tachard Passos, San Francisco, CA (US); David Edgar Lluncor, Mountain View, CA (US); Shahar Jamshy, Sunnyvale, CA (US); Tal Shaked, Los Altos, CA (US); Tushar Deepak Chandra, Los Altos, CA (US)

(73) Assignee: Google LLC, Mountain View, CA (US)

( * ) Notice: Subject to any disclaimer, the term of this patent is extended or adjusted under 35 U.S.C. 154(b) by 579 days.

(21) Appl. No.: 14/820,751

(22) Filed: Aug. 7, 2015

(65) Prior Publication Data

US 2017/0039483 A1 Feb. 9, 2017

(51) Int. Cl.
G06N 99/00 (2010.01)
G06F 17/30 (2006.01)
G06N 5/04 (2006.01)

(52) U.S. Cl.
CPC ..... *G06N 99/005* (2013.01); *G06F 17/30477* (2013.01); *G06F 17/30864* (2013.01); *G06N 5/04* (2013.01)

(58) Field of Classification Search
None
See application file for complete search history.

(56) References Cited

U.S. PATENT DOCUMENTS

| | | | | |
|---|---|---|---|---|
| 8,032,507 B1 * | 10/2011 | Bayardo | ............. | G06F 17/3069 707/706 |
| 9,443,028 B2 * | 9/2016 | Song | ................. | G06F 17/30864 |
| 9,594,851 B1 * | 3/2017 | Chechik | .............. | G06F 17/3097 |
| 2005/0149516 A1 * | 7/2005 | Wolf | ....................... | G06F 17/30 |
| 2006/0235812 A1 | 10/2006 | Rifkin | | |
| 2009/0248661 A1 * | 10/2009 | Bilenko | ............ | G06F 17/30864 |
| 2009/0248667 A1 * | 10/2009 | Zheng | ............... | G06F 17/30702 |
| 2011/0029517 A1 * | 2/2011 | Ji | ....................... | G06F 17/30864 707/734 |
| 2011/0191313 A1 | 8/2011 | Dupret et al. | | |
| 2012/0078825 A1 | 3/2012 | Kulkarni et al. | | |
| 2014/0156231 A1 | 6/2014 | Guo | | |
| 2014/0180760 A1 | 6/2014 | Karatzoglou | | |

FOREIGN PATENT DOCUMENTS

WO    WO2012034606 A3    11/2012

OTHER PUBLICATIONS

Roy, Rishiraj Saha et al.; An IR-based Evaluation Framework for Web Search Query Segmentation; 2012; ACM; SIGIR'12; pp. 881-890. (Year: 2012).*

(Continued)

*Primary Examiner* — Stanley K. Hill
(74) *Attorney, Agent, or Firm* — Fish & Richardson P.C.

(57) ABSTRACT

Methods, systems, and apparatus, including computer programs encoded on a computer storage medium, for training a factorization model to learning features of model inputs of a trained model such that the factorization model is predictive of outcome for which the machine learned model is trained.

19 Claims, 4 Drawing Sheets

(56) References Cited

OTHER PUBLICATIONS

Rendle, Steffen; Social Network and Click-through Prediction with Factorization Machines; 2012; ACM; KDDCup'12; 7 pages. (Year: 2012).*

Bendersky, Michael et al.; Two-Stage Query Segmentation for Information Retrieval; 2009; ACM; SIGIR'09; pp. 810-811. (Year: 2009).*

Li, Yanen et al.; Unsupervised Query Segmentation Using Clickthrough for Information Retrieval; 2011; ACM; SIGIR'11; pp. 285-294. (Year: 2011).*

European Search Report in European Application No. 16182717.5, dated Sep. 8, 2016, 10 pages.

Zhang et al., "Towards mobile intelligence: Learning from GPS history data for collaborative recommendation," Artificial Intelligence, Jun. 2012, 184-185:17-37.

Rendle, 'Factorization Machines with libFM,' ACM Transactions on Intelligent Systems and Technology, 3:3 Article 57, May 2012, 22 pages.

Rendle, 'Factorization Machines,' Proceedings of the 10th IEEE International Conference on Data Mining (ICDM 2010), 6 pages.

* cited by examiner

FACTORIZED MODELS

BACKGROUND

The Internet enables access to a wide variety of resources, such as video or audio files, web pages for particular subjects, book articles, or news articles. A search system can identify resources in response to a user query that includes one or more search terms or phrases. The search system ranks the resources based on their relevance to the query and importance and provides search results that link to the identified resources, and orders the search results according to the rank.

A search system uses a search operation to identify resources that are responsive to the query. The search operation takes into account features of the resources and the query, and perhaps other information, when generating search scores for the resources. Typically the search operation implements a robust search algorithm that performs well over a wide variety of resources. However, sometimes it is desirable to model outcomes with respect to a query and a resource. For example, models can be machine learned to predict outcomes such as a likelihood of an installation of an application given a query; a likelihood of a purchase given a query; and so on. Often these models emit scoring rules in the form of tuples that define a feature for a query-resource pair and a constituent value. While these tuples may express rules that are very accurate for observed data, the rules may not readily apply to data not yet observed. Examples of data not yet observed are very long tail queries (or new queries), newly published resources, and any query resource pair that has not yet been observed.

SUMMARY

This specification describes technologies relating to factoring predictive scores for query and document pairs into similarity scores between queries and documents.

In general, one innovative aspect of the subject matter described in this specification can be embodied in methods that include the actions of accessing a machine learned model trained to predict an outcome, the training being on a set of query-resource pairs, wherein each query-resource pair corresponds to a respective query and a respective resource observed as having been identified as being responsive to the respective query, the training generating a plurality of tokens that describe at least a pair of features derived from the query-resource pair and a constituent weights for an outcome for which the machine learned model is trained, and wherein a likelihood of the outcome for a given query and given resource of a query-resource pair is based on the constituent weights of the tokens that correspond to the given query and given resource; for each of the queries of the query-resource pairs, generating a respective query feature vector having a cardinality of elements, each element corresponding to a query feature value of a feature to be learned; for each of the resources of the query-resource pairs, generating a respective resource feature vector having the cardinality of elements, each element corresponding to a resource feature value of a feature to be learned; and training a factorization model to learn a query feature value for each element of each query feature vector and a resource feature value for each element of each resource feature vector such that the factorization model output, based on the respective feature vectors of a given query and given resource, is predictive of outcome for which the machine learned model is trained. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By factorizing scores predictive of an outcome for a model trained on observed <query, resource> pairs, a score predictive of the outcome can be generated for <query, resource> pairs that were not observed (or rarely observed). This results in a more robust prediction in the case of rarely seen queries, and also ensures that the factorized model is consistent with a learned model that the system also utilizes. The factorized model, in some implementations, may be pre-cached for frequently received queries to reduce system resource requirements at serving time. Furthermore, in some implementations, for a <query, resource> pair that is indicative of a navigational query, e.g., a query for which a single resource or website is sought, the query may be omitted from factorization and/or from pre-caching.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A system learns factorized embeddings in the form of feature vectors for queries and resources, and uses the factorized embedding to score resources for a query. The score is indicative of a modeled outcome, e.g., a likelihood of a click of a search result; or a likelihood of an installation of an application; or any other outcome for which a machine learning process may be used to generate a predictive model from observed data.

In some implementations, the system generates the factorized model in combination with the generation of a machine learned model that models an outcome. The machine learned model is trained on observed query-resource pairs. Each query-resource pair corresponds to a respective query and a respective resource identified as being responsive to the respective query. The machine learned model is used to generate tokens that each describe at least a pair of features derived from the query-resource pair and a constituent weight for an outcome for which the machine learned model was trained. The likelihood of the outcome for a given query and given resource of a query-resource pair is based on the constituent weights of the tokens that correspond to the given query and given resource.

For each of the queries of the query-resource pairs, the system generates a respective query feature vector having a cardinality of elements. Each element corresponds to a query feature value of a feature to be learned. Likewise, for each of the resources of the query-resource pairs, the systems generates a respective resource feature vector having the cardinality of elements. The system then trains a factorization model to learn a query feature value for each element of each query feature vector and a resource feature value for each element of each resource feature vector. The query feature values and the resource feature values for a given query and a given resource are learned such that the factorization model is predictive of the outcome for which the machine learned model was trained. In some implementations, the factorization model predicts the outcome for which the learned model is trained based on inner products of the query feature vectors and resource feature vectors.

The resource feature vectors are then tokenized for indexing with the respective indexed data for the resources. The query feature vectors may be stored for the queries and retrieved for each query at query time. Optionally, scores based on the query and resource vectors may be computed prior to query time and cached by a search system or indexed for resources prior to query time.

In some implementations, the machine learned model and the factorization model are trained jointly using ground truth data for the training data. In other implementations, the machine learned model is learned first, and then the factorization model is learned such that the output based on the respective feature vectors of the given query and the given resource models the outcome of the machine learned model.

Regardless of the particular technique used, the factorization model can produce a score for a query resource pair for which the machine learned model was not trained and/or for which a scoring token does not exist. Accordingly, the factorized model provides coverage that is more robust than a machine learned model trained on observed data and for which the tokens were derived.

These features and additional features are described in more detail below.

Example Operating Environment

Figure 1:
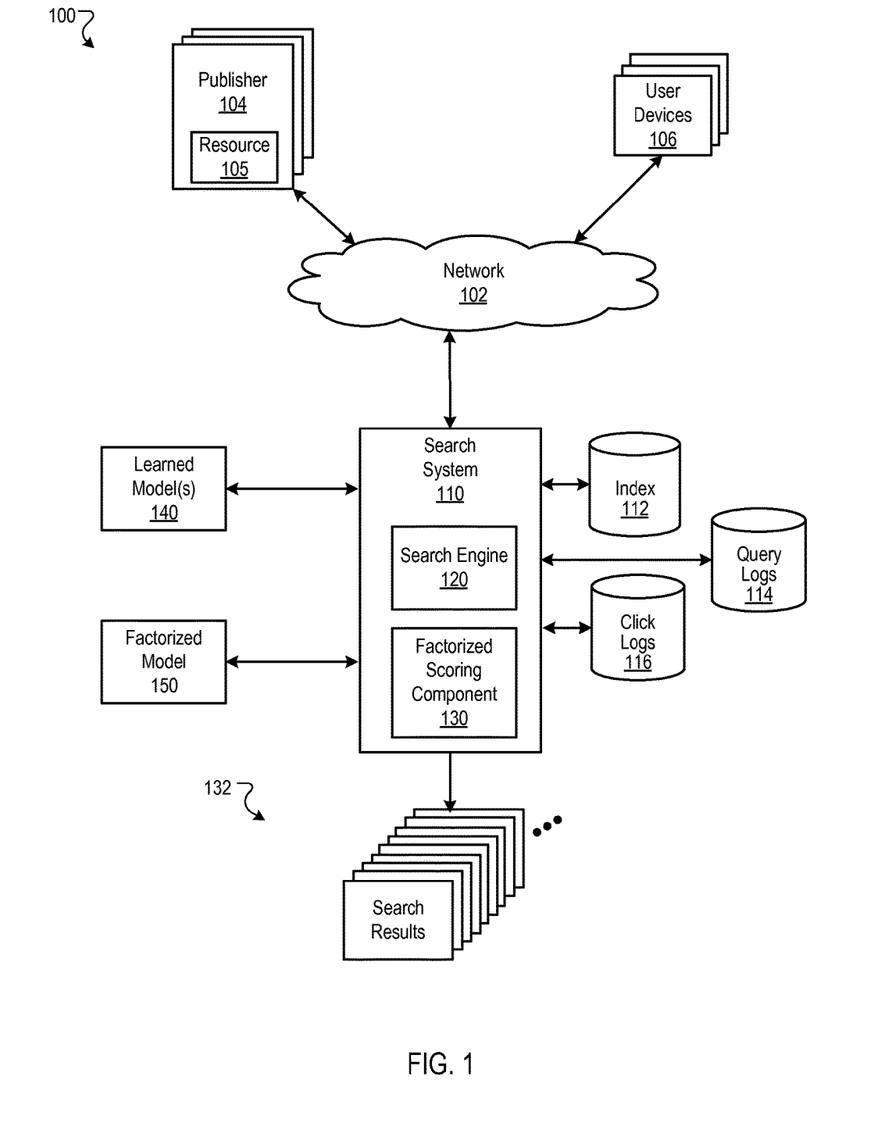
FIG. 1 is a block diagram of an example environment in which a factorized model is used for search processing.

FIG. 1 is a block diagram of an example environment in which a factorized model is used for search processing. A computer network 102, such as the Internet, connects publisher systems 104, user devices 106, and a search system 110. The online environment 100 may include many thousands of publisher system 104 and user devices 106.

A publisher system 104 can be a website, an application store, a media store, or any other system that provides resources over the network. In the case of a website, the publisher 104 includes one or more resources 105 associated with a domain name and hosted by one or more servers. In the case of an application store, the publisher system 104 hosts multiple applications that may be downloaded to user device 104.

A resource is any data that can be provided by the publisher website 104 over the network 102 and that is associated with a resource address. Resources include HTML pages, images, video, and applications, to name just a few.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of these resources 105, the search system 110 identifies the resources by crawling the publisher websites 104 and indexing the resources provided by the publisher websites 104. The indexed data are stored in an index 112. While the search system 110 is described as a general search system that can search resources from multiple publishers, the search features and models described below can instead be implement by a publisher; for example, a publisher of an application store may use the search system to search only applications that the publishers hosts and offers for sale.

The user devices 106 submit search queries to the search system 110. In response to the queries, the search system 110 uses the index 112 to identify resources that are relevant to the queries.

The search engine 120 utilizes a search operation that generates search scores for the resources, and ranks the resources based on search scores. The search operation quantifies the relevance of the resources to the query, and the quantification can be based on a variety of factors. Such factors include information retrieval ("IR") scores, user feedback scores, and optionally a separate ranking of each resource relative to other resources (e.g., an authority score).

One or more learned models 140 may also be used to score resources in addition to, or in lieu of, the scoring processes described above. For example, if the resources are advertisements, a learned model that predicts a click or selection of the advertisement given a particular query may be used. Conversely, if the resources are applications, a learned model that predicts an installation of the application may be used. Additionally, multiple different learned models may be used in a search process in which each outcome contributes to an overall score for each resource.

Assuming the resources are, for example, applications, web pages, or other resources for which a user will benefit from a list of search results, the search system 110 generates search results 132 that identify the resources and returns the search results 132 to the user devices 106. Selection of a search result will provide the application identified by the search result to the user device 106 (or, alternatively, provide a page from which another resource, such as an application, can be downloaded).

The queries submitted from user devices 106 are stored in query logs 114. Click data and other data describing actions taken in response to search results for the queries and the resources by the search results are stored in click logs 116. The query logs 114 and click logs 116 can be used to map queries submitted by the user devices to web pages that were identified in search results and the actions taken by users. The click logs 116 and query logs 114 can thus be used by the search system to determine queries submitted by the user devices, the actions taken in response to the queries, and how often the queries are submitted. Such information can be used, for example, in scoring resources and training learned models 140.

Factorized Model Generation

Often a query-resource pair is not reflected in the scoring data generated from learned models 140. Examples of such query-resource pairs are pairs for long tail queries or queries of a first instance, pairs for resources that are newly published, or simply query-resource pairs that may have been omitted from training data used to generate a model. Thus the system 110 includes a factorized model 150 that can predict an informative score even if the query-resource pair has not been previously modeled. Accordingly, instead of treating every query-resource pair as a special case and learning a score separately, the factorized model 150 can score any arbitrary query-resource pair.

Although only one factorized model 150 is shown in FIG. 1, multiple different factorized models can be used. Each factorized model 150 is trained to generate an outcome of a corresponding learned model 140 based on the query-resource pairs of the learned model 140. For example, the training or scoring data for a learned model 140 that predicts installations of free applications can be used to generate a factorized model that makes similar predictions; the training or scoring data for a learned model that predicts purchases of an application can be used to generate a factorized model that makes similar predictions; and so on.

The factorized model 150 is utilized to provide predictive outputs to a factorized scoring component 130 that is used by the search engine 120 to score resources in response to a query. In some implementations, the factorized model learns a set of underlying attributes of a query and a resource, and then predicts a score based on how well the query's attributes match the resource's attributes. In a particular implementation, the factorized model 150 learns feature vector for each query and each resource, and the weight of a query-resource pair is computed as the inner product of their respective vectors.

Figure 2:
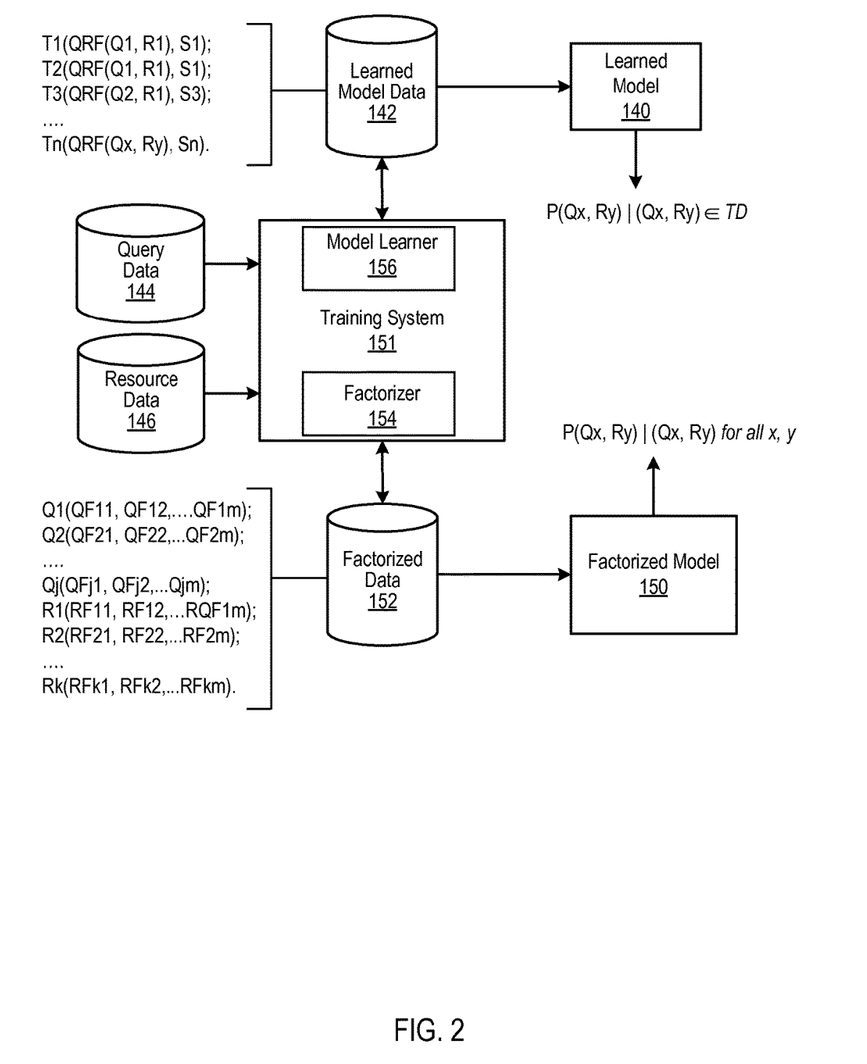
FIG. 2 is a system flow diagram of an example process for generating a factorized model.

FIG. 2 is a system flow diagram 200 of an example process for generating a factorized model 150. Operation of the system flow diagram is also described with reference to FIG. 3, which is a flow diagram of an example process 300 for generating a factorized model.

In operation, a training system 151 includes a factorizer 154 and a model learner 156. In some implementations, the factorizer 154 and the model learner 156 may jointly train over training data, and the factorizer 154 may optimize the predicted outcome of the learned model 140. In other implementations, the factorizer 154 may be trained based on scoring data of the learned model 140 such that the factorized data models the outcome of the learned mode 140.

Figure 3:
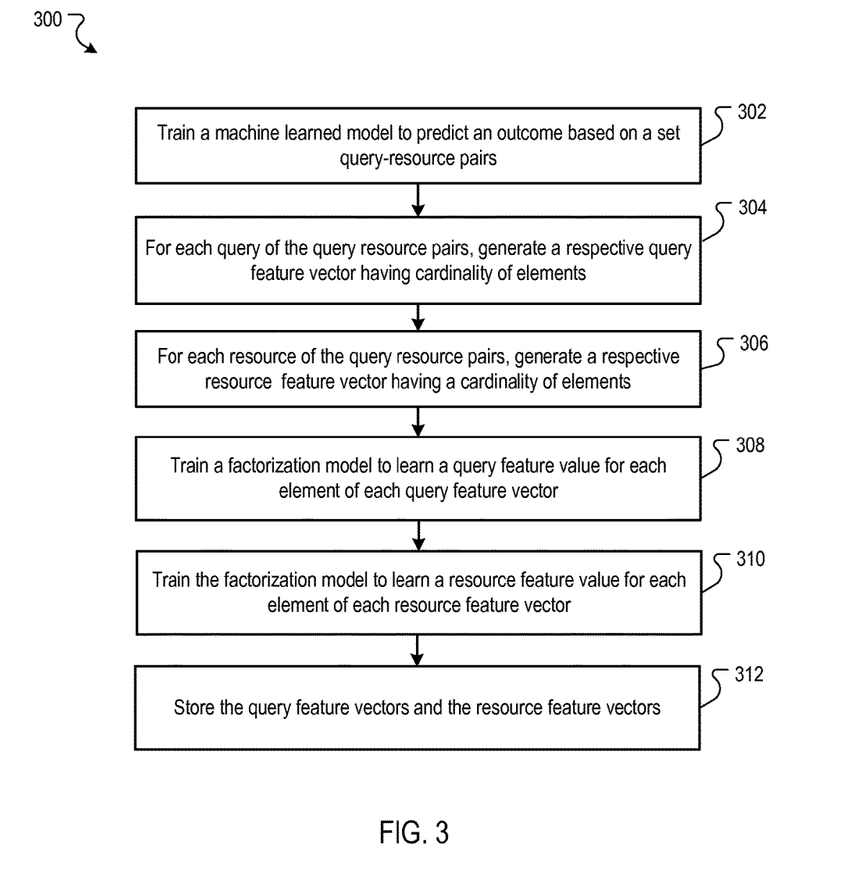
FIG. 3 is a flow diagram of an example process for generating a factorized model.

The process 300 trains a machine learned model to predict an outcome based on a set query-resource pairs (302). Each query-resource pair corresponds to a respective query and a respective resource identified as being responsive to the respective query. The machine learned model may, in some implementations, generate a set of tokens. Each token describes at least a pair of features derived from the query-resource pair and a constituent weight for an outcome for which the machine learned model is trained. For example, a particular token may be of the form:
[Q: email; R: example_page.com; 0.7]

The token indicates when a query includes the keyword "email" and the user is presented with a search result referencing example_page.com, there is a constituent weight of an outcome (e.g., selecting the search result, or whatever outcome for which the model 140 was trained to predict) of 0.7. The value of 0.7 may be a value that is used as input to a subsequent search process for scoring. Alternatively, the value of 0.9 may be a likelihood.

The features of the token need not be limited to features that are derived directly from either the query or the resource. For example, the token can also include country origin information, agent type, location, user device type, and the like. For example, another token may be of the form:
[Q: email; R: example_page.com; Agent: Chrome; 0.82]

Here, the additional feature of "Agent" identifies a browser that a user is using to input a search request.

In some implementations, the learned model data 142 for a learned model 140 is generated in the form of tokens. The tokens are depicted by the generalized form Tn(QRF(Qx, Ry), Sn), where each QRF(Qx, Ry) is one or more features for a query resource pair of query Qx and resource Ry, and Sn is the constitute score for the feature. The score Sn is used to generate a likelihood of an outcome for a given query and given resource of a query-resource pair.

As depicted in FIG. 2, the learned model data 142 for the learned model 140 can be used to generate a predicted outcome P(Qx, Ry) for each query-resource pair that has corresponding token data TD. The factorizer 154 can be used to factorize the query features and resources features of query-resource pairs to predict a modeled outcome. Thus, the resulting factorized model 150 can generate a predicted outcome P(Qx, Ry) for all query-resource pairs, including those for which there are not corresponding token data TD.

The process 300, for each query of the query resource pairs, generates a respective query feature vector having predefined cardinality of elements (304). As shown in FIG. 2, query feature vectors Qj(QFj1 ... QFjm) are generated for j queries, with a cardinality of m. The cardinality may be learned or may be predefined. Likewise, the process 300, for each resource of the query resource pairs, generates a respective resource feature vector having cardinality of elements (306). As similarly shown in FIG. 2, resource feature vectors Rk(RFk1 ... RFkm) are generated for k resources, with a predefined cardinality of m.

The particular features QF and RF need not be predefined, and instead may be emergent during the factorization process. In the case of the cardinality being predefined, a system administration may select the cardinality of the set, e.g., 10, 20 or 30 elements, for example. The selection may be based on the desired robustness of the model, the training resources available, and the query processing resources that are available.

The process 300 trains a factorization model to learn a query feature value for each element of each query feature vector (308), and likewise trains the factorization model to learn a resource feature value for each element of each resource feature vector (310). The values are learned such that the factorization model output, based on the respective feature vectors of a given query and a given resource, models the outcome. In the case of joint training with the machine learned model, the outcome that is modeled may be based on ground truth labels of training data. In the case of using the machine learned model as a prior, the factorized model is trained such that it models the outcome of the learned model based on the query-resource pairs for a given query and a given resource. Furthermore, in addition to the query-resource tokens, the factorizer 154 may also access other query data 144 and resource data 146 to train the factorization model.

Any appropriate factorization learning process may be used to learn the factorized model 150. For example, for a factorization model with a degree of 2, the following model equation may be used:

$$\hat{y}(x) := w_0 + \sum_{i=1}^{n} w_i x_i + \sum_{i=1}^{n} \sum_{j=i+1}^{n} (v_i, v_j) x_i x_j$$

$$w_0 \in \mathbb{R}, w \in \mathbb{R}^n, V \in \mathbb{R}^{n \times k}$$

and $v_i$ and $v_j$ are the query and resource vectors, and $<v_i, v_j>$ is the inner product of a query vector i and resource vector j. The model parameters can be learned, for example, by gradient descent methods for a variety of losses.

While a 2-way factorization model is described above, a generalized n-way factorization model can also be used.

Once the feature values are learned such that the factorized model 150 models the outcome sufficiently, the process 300 stores the query feature vectors and the resource feature vectors (312). The factorized data 152 in which the query feature vectors and resource feature vectors are stored may be accessed by the search system 110 to facilitate resource scoring for queries.

In some implementations, corresponding data for navigational queries may be omitted when training the factorization model 150. A navigational query is a query for which a particular resource has a very high selection rate for the query relative to nearly all other resources. Such behavior by users is indicative of the query being one for which users enter to find the particular resource. In other implementations, only corresponding data for queries that are determined to be categorical queries are used to train the factorization model 150. A categorical query is a query that covers a broad topic or category and for which there may be many results that are determined to be of similar relevance to the query.

Query Processing Using Factorized Model Data

As described above, the search system 110 uses the factorized model 150 to score resources responsive to a query. In operation, for a given query, a score for a given resource is generated based on the query feature vector for the query and the resource feature vector for the resource. Depending on the serving constraints of the search system 110, the search system 110 may generate scores with the factorization mode at query time, or, alternatively, may pre-cache query-to-resource scores at system initialization.

To generate scores at query time, the system 110, for a given query, checks to determine if a query feature vector for the query is stored in the factorized data. If not, then the factorized model 150 is not used. However, if a query feature vector is found, then for each resource that is scored by the search system 110 (or, alternatively, the top N resources scored, where N is a proper subset of scored resources, such as 200, 300 or 400, for example), the factorized mode 150 generates a query-to-resource score based on an inner product of the query feature vector and the resource feature vector for the resource. The scores for the resource may be used, for example, to adjust the ranking of the resources from a first order to a second, different order.

Alternatively, the scores generated by the factorized model 150 can instead be used to select an initial set of resources in response to the query. Search results for the resources may then be returned to the user device in an order based solely on the factorized model scores.

In situations where caching is desired, the system 100 pre-computes query-resource scores at indexing time, or upon a system initialization, and then caches the scores so that they can be retrieved at query time.

Figure 4:
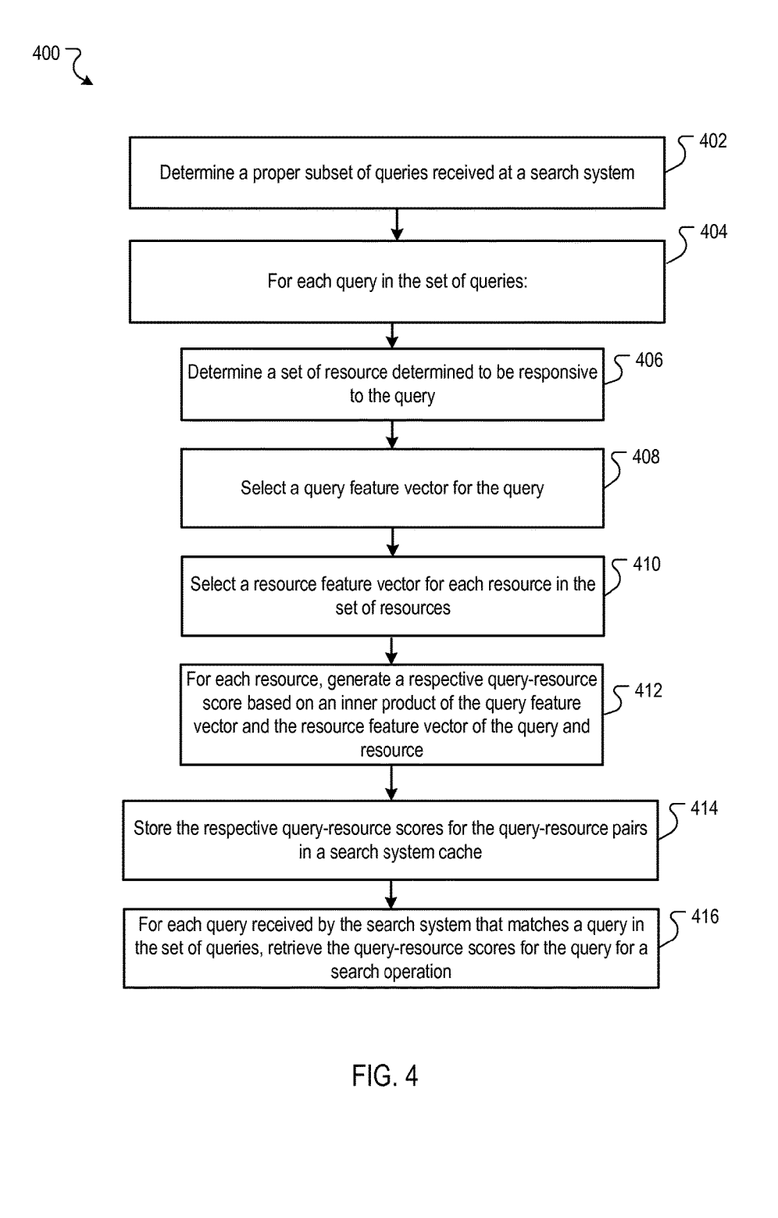
FIG. 4 is a flow diagram of an example process for pre-caching scores based on factorized models.

FIG. 4 is a flow diagram of an example process 400 for pre-caching scores based on factorized models. In the implementation of FIG. 4, scores are pre-cached for a subset of queries.

The process 400 determines a proper subset of queries received at the search system (402). In some implementations, the proper subset of queries are queries that are most popular relative to other queries received at a search system. For example, the N most popular queries by receipt frequency may be selected. Other ways of selecting popular queries may also be used.

The process 400 processes each query according to the following process steps 406, 408, 410 and 412 (404). First, the process 400 determines a set of resource determined to be responsive to the query (406). For example, the search system 110 may score resources responsive to the query. The scoring does not take into account the factorization model 150.

The process 400 selects a query feature vector for the query (408), and then the process 400 selects a resource feature vector for each resource in the set of resources (410). Thus, for a particular query, the process 400 has access to the query feature vector and the resource feature vectors of resources determined to be responsive to the query.

The process 400, for each resource, generates a respective query-resource score based on an inner product of the query feature vector and the resource feature vector of the query and resource (412). The process 400 then stores the respective query-resource scores for the query-resource pairs in a search system cache (414).

Thereafter, at query time, the process 400, for each query received by the search system that matches a query in the set of queries, retrieves the query-resource scores for the query for a search operation (416). Thus, the scores for the resources that are determined to be responsive to the query are made available with minimal resource usage at query time.

Additional Implementation Details

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
   training a machine learned model to predict an outcome, the training being on a set of query-resource pairs, wherein each query-resource pair corresponds to a respective query and a respective resource observed as having been identified as being responsive to the respective query, the training generating a plurality of tokens that each describe at least a pair of features derived from the query-resource pair and a constituent weight for the outcome for which the machine learned model is trained, and wherein a likelihood of the outcome for a given query and given resource of a query-resource pair is based on the constituent weights of the tokens that correspond to the given query and given resource;
   for each of the queries of the query-resource pairs, generating a respective query feature vector having a cardinality of elements, each element corresponding to a query feature value of a feature to be learned;
   for each of the resources of the query-resource pairs, generating a respective resource feature vector having the cardinality of elements, each element corresponding to a resource feature value of a feature to be learned; and
   training a factorization model to learn a query feature value for each element of each query feature vector and a resource feature value for each element of each resource feature vector such that the factorization model output, based on the respective feature vectors of a given query and given resource, is predictive of outcome for which the machine learned model is trained.

2. The computer-implemented method of claim 1, wherein the factorization model predicts the outcome based on inner products of the query feature vectors and resource feature vectors.

3. The computer-implemented method of claim 1, wherein the query features and the resource features are emergent from the training of the factorization model.

4. The computer-implemented method of claim 1, wherein generating a respective query feature vector having cardinality of elements comprises generating a respective query feature vector for only queries that are not navigational queries.

5. The computer-implemented method of claim 1, wherein generating a respective query feature vector having cardinality of elements comprises generating a respective query feature vector for only queries that are categorical queries.

6. The computer-implemented method of claim 1, further comprising:
   determining a set of queries that is a proper subset of queries received at a search system;
   for each of the queries in the set of queries:
     determining a set of resources determined to be responsive to the query;
     selecting a query feature vector for the query;
     selecting a resource feature vector for each resource in the set of resources;
     generating a respective query-resource score based on an inner product of the query feature vector and the resource feature vector of the query and resource;
     storing the respective query-resource score for the query-resource pair in a search system cache; and
   for each query received by the search system that matches a query in the set of queries, retrieving the query-resource scores for the query for a search operation.

7. The computer-implemented method of claim 6, wherein determining a set of queries that are a proper subset of queries comprises determining a set of queries that are most popular relative to other queries received at the search system.

8. The computer-implemented method of claim 1, further comprising:
   receiving, for a query from a user device, data identifying a set of resources that are determined to be responsive to the query and ranked according to a first order;
   determining for each resource, from the factorization model, a likelihood of the outcome based on an inner product of the query feature vector for the query learned from the factorization model and the resource feature vector for the resource learned from the factorization model;
   adjusting the ranking of the resources based, in part, on the determined likelihood of the outcome so that the set of resources are ranked according to a second order; and
   providing, to the user device, data identifying the resources according to the second order.

9. The computer-implemented method of claim 8, wherein the resources are applications, and the outcome is an installing of an application on the user device.

10. The computer-implemented method of claim 8, wherein the resources are audio files, and the outcome is a purchase of the audio file by a user.

11. The computer-implemented method of claim 8, wherein:
   determining for each resource, from the factorization model, a likelihood of the outcome based on an inner product of the query feature vector for the query learned from the factorization model and the resource feature vector for the resource learned from the factorization model comprises determining the likelihood for only query and resource pairs for which the learned model was not trained; and
   further comprising determining, from the learned model, the likelihood of the outcome for each query and resource pair for which the learned model was trained.

12. A computer storage medium encoded with a computer program, the program comprising instructions that when executed by a data processing apparatus cause the data processing apparatus to perform operations comprising:
- training a machine learned model to predict an outcome, the training being on a set of query-resource pairs, wherein each query-resource pair corresponds to a respective query and a respective resource observed as having been identified as being responsive to the respective query, the training generating a plurality of tokens that each describe at least a pair of features derived from the query-resource pair and a constituent weight for the outcome for which the machine learned model is trained, and wherein a likelihood of the outcome for a given query and given resource of a query-resource pair is based on the constituent weights of the tokens that correspond to the given query and given resource;
- for each of the queries of the query-resource pairs, generating a respective query feature vector having a cardinality of elements, each element corresponding to a query feature value of a feature to be learned;
- for each of the resources of the query-resource pairs, generating a respective resource feature vector having the cardinality of elements, each element corresponding to a resource feature value of a feature to be learned; and
- training a factorization model to learn a query feature value for each element of each query feature vector and a resource feature value for each element of each resource feature vector such that the factorization model output, based on the respective feature vectors of a given query and given resource, is predictive of outcome for which the machine learned model is trained.

13. A system comprising:
- a data processing apparatus; and
- a computer storage medium encoded with a computer program, the program comprising instructions that when executed by the data processing apparatus cause the data processing apparatus to perform operations comprising:
- accessing a machine learned model trained to predict an outcome, the training being on a set of query-resource pairs, wherein each query-resource pair corresponds to a respective query and a respective resource observed as having been identified as being responsive to the respective query, the training generating a plurality of tokens that each describe at least a pair of features derived from the query-resource pair and a constituent weight for the outcome for which the machine learned model is trained, and wherein a likelihood of the outcome for a given query and given resource of a query-resource pair is based on the constituent weights of the tokens that correspond to the given query and given resource;
- for each of the queries of the query-resource pairs, generating a respective query feature vector having a cardinality of elements, each element corresponding to a query feature value of a feature to be learned;
- for each of the resources of the query-resource pairs, generating a respective resource feature vector having the cardinality of elements, each element corresponding to a resource feature value of a feature to be learned; and
- training a factorization model to learn a query feature value for each element of each query feature vector and a resource feature value for each element of each resource feature vector such that the factorization model output, based on the respective feature vectors of a given query and given resource, is predictive of outcome for which the machine learned model is trained.

14. The system of claim 13, wherein the factorization model predicts the outcome based on inner products of the query feature vectors and resource feature vectors.

15. The system of claim 13, wherein the query features and the resource features are emergent from the training of the factorization model.

16. The system of claim 13, wherein generating a respective query feature vector having cardinality of elements comprises generating a respective query feature vector for only queries that are not navigational queries.

17. The system of claim 13, wherein generating a respective query feature vector having cardinality of elements comprises generating a respective query feature vector for only queries that are categorical queries.

18. The system of claim 13, the operations further comprising:
- determining a set of queries that a is proper subset of queries received at a search system;
- for each of the queries in the set of queries:
  - determining a set of resources determined to be responsive to the query;
  - selecting a query feature vector for the query;
  - selecting a resource feature vector for each resource in the set of resources;
  - generating a respective query-resource score based on an inner product of the query feature vector and the resource feature vector of the query and resource;
  - storing the respective query-resource score for the query-resource pair in a search system cache; and
- for each query received by the search system that matches a query in the set of queries, retrieving the query-resource scores for the query for a search operation.

19. The system of claim 17, wherein the resources are applications, and the outcome is an installing of an application on the user device.

* * * * *

UNITED STATES PATENT AND TRADEMARK OFFICE
CERTIFICATE OF CORRECTION

Page 1 of 1

PATENT NO. : 10,102,482 B2
APPLICATION NO. : 14/820751
DATED : October 16, 2018
INVENTOR(S) : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this
Eighteenth Day of June, 2019

Andrei Iancu
*Director of the United States Patent and Trademark Office*